United States Patent [19]

Oizumi et al.

[11] Patent Number: 5,125,735
[45] Date of Patent: Jun. 30, 1992

[54] AUTOMATIC MULTI-POINT DISTANCE MEASURING DEVICE

[75] Inventors: Kouji Oizumi; Takashi Matsushita, both of Kanagawa, Japan

[73] Assignee: Canon Kabushiki Kaisha, Tokyo, Japan

[21] Appl. No.: 558,430

[22] Filed: Jul. 27, 1990

[30] Foreign Application Priority Data

Jul. 31, 1989 [JP] Japan ................. 1-198271

[51] Int. Cl.⁵ .................. G01C 3/00; G01C 5/00; G03B 3/00
[52] U.S. Cl. .................... 356/1; 250/201.6; 354/403; 359/668; 359/741
[58] Field of Search ............ 356/1, 4; 354/403; 250/201.6; 359/668, 741

[56] References Cited

U.S. PATENT DOCUMENTS

| | | | |
|---|---|---|---|
| 4,371,261 | 2/1983 | Tsuji | 356/1 |
| 4,631,397 | 12/1986 | Ohsato et al. | 250/201.6 |
| 4,748,469 | 5/1988 | Tamura | 356/1 X |
| 4,843,227 | 6/1989 | Matsui et al. | 250/201.6 |

FOREIGN PATENT DOCUMENTS 60-233610 11/1985 Japan .

Primary Examiner—Stephen C. Buczinski
Attorney, Agent, or Firm—Fitzpatrick, Cella, Harper & Scinto

[57] ABSTRACT

A distance measuring device has a light source for emitting a plurality of light beams in a plurality of directions, and a light receiving lens having a plurality of optical axes for receiving the plurality of light beams reflected from objects in said plurality of directions. Light receiving apparatus is provided for receiving the reflected light beams passing through said light receiving lens and providing an output corresponding to distances to the object. The light receiving lens has (1) a central portion with a thickness (D), a focal length $f_a$, and a refractive index $\phi_A$, and (2) a second portion adjacent said central portion. Surfaces of said central and second portions closest to said light receiving apparatus comprising one spherical surface having a refractive power $\phi_R$. the central and second portions being disposed to satisfy the following conditions:

$$0.4 < D/f_A < 1.5,$$

and $$-0.05 < \phi_R/\phi_A < 0.15, \phi_A > 0.$$

2 Claims, 6 Drawing Sheets

AUTOMATIC MULTI-POINT DISTANCE MEASURING DEVICE

BACKGROUND OF THE INVENTION

1. Field of the Invention

This invention relates to an automatic multi-point distance measuring device using a plurality of light beams projected in different directions to the object field so as to measure the distances of objects which lie in these directions with the use of a lens for receiving the light beams reflected from the objects.

2. Description of the Related Art

In the active type of distance measuring device, to allow a plurality of points in the image field to be measured in distance at once, there has been a previous proposal in Japanese Laid-Open Patent Application No. Sho 60-233610 (U.S. Pat. No. 4,748,469) where light is projected as spots to various positions in the field of view of the photographic instrument, and, by taking its reflection, a plurality of object distances are detected. This distance measuring device is constructed as shown in FIG. 9. In FIG. 9, a light projecting lens 2 and a light receiving lens 5 are made by a production technique shown in FIG. 10. That is, from three lenses 5a, 5b and 5c of the same specification, respective portions of different areas are cut out. These are then combined side by side to form a composite lens 5 having three optical axes. In FIG. 9, 1 is a light source, 6 is a light sensor, and 7 is a distance measuring circuit (see FIG. 1 of U.S. Pat. No. 4,748,469).

Another production technique of using two lenses in combination to make a light receiving lens for the active type automatic distance measuring device is known in U.S. Pat. No. 4,371,261.

SUMMARY OF THE INVENTION

The present invention is to take into consideration improvements of even the spot imagery over the above-described conventional examples.

An object of the invention is to provide a more specific form of the optical system which enables the distance measuring device to perform distance measurement with higher accuracy than was heretofore possible.

According to the invention, a plurality of light beams for distance measurement are projected in different directions to the object side, and the light beams for distance measurement reflected from objects which lie in certain directions are received by a light receiving lens having a plurality of optical axes, so that the distances from the distance measuring device to the objects are determined by the positions of images formed by the light beams on a light receiving sensor arranged on the image side of the light receiving lens. In such a distance measuring device, of a plurality of distance measuring directions, a central distance measuring direction as viewed from the light receiving sensor, or a principal distance measuring direction, is referred to as the "A direction", and one of the distance measuring directions adjacent to the A direction is referred to as the "B direction" (in an embodiment to be described later, there is a C direction symmetric to the B direction with respect to the A direction). Portions of the light receiving lens which are assigned to receive the light beams for distance measurement from the A direction and the B direction each are formed to a specific shape. To figure these shapes, the present embodiment sets forth conditions cited below. Referring to the portions of the light receiving lens for receiving the distance measuring light beams as "A portion" and "B portion" of the light receiving lens, respectively, letting the focal lengths of the A portion of the light receiving lens and the B portion of the light receiving lens be denoted by $f_A$ and $f_B$, respectively, the distance between optical axes of the A portion of the light receiving lens and the B portion of the light receiving lens at their object side surfaces by d, and the angle between the A direction and the B direction as viewed from the light receiving sensor by $\theta$, the following conditions are satisfied:

$$0.8 < f_B/f_A < 1.2,\ f_A > ,\ f_B > 0$$

$$0.8 < d/(f_B \tan \theta) < 1.5$$

Meanwhile, letting the lens thickness of the A portion of the light receiving lens be denoted by D, the following condition is satisfied:

$$0.4 < D/f_A < 1.5$$

Also, letting the refractive power of the A portion of the light receiving lens be denoted by $\phi_A$ and the refractive power of only that surface of the A portion of the light receiving lens which faces the light receiving sensor by $\phi_R$, the following condition is satisfied:

$$-0.05 < \phi_R/\phi_A < 0.15,\ \phi_A > 0$$

DETAILED DESCRIPTION OF THE PREFERRED EMBODIMENTS

Figure 1:
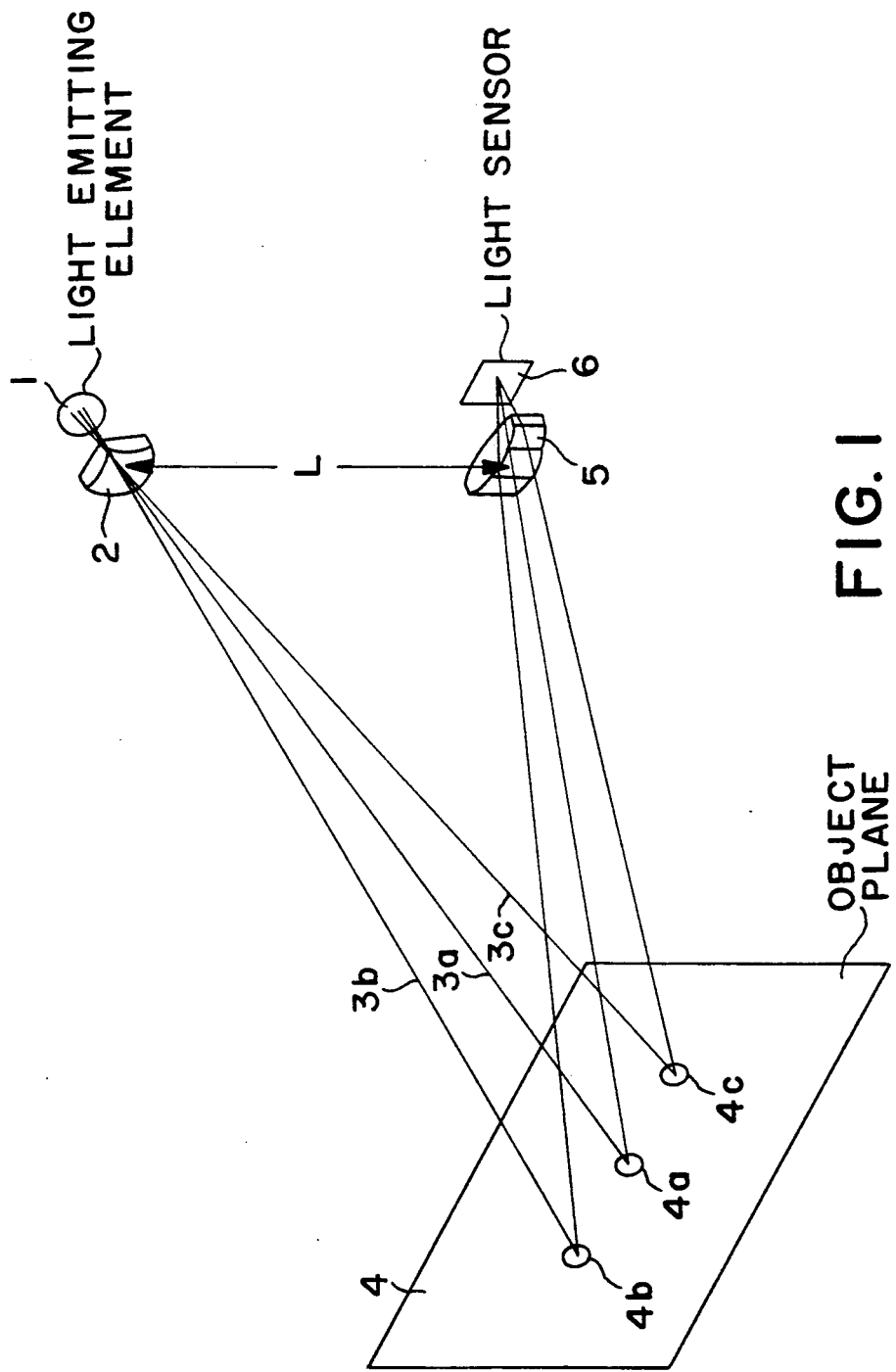
FIG. 1 is an entire perspective view of the arrangement of the parts of a distance measuring system employing one form of the invention.
Figure 2:
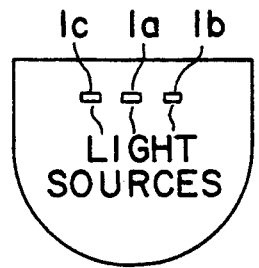
FIG. 2 is a sectional view of an example of an AF light-emitting element used in the invention.
Figure 3A:
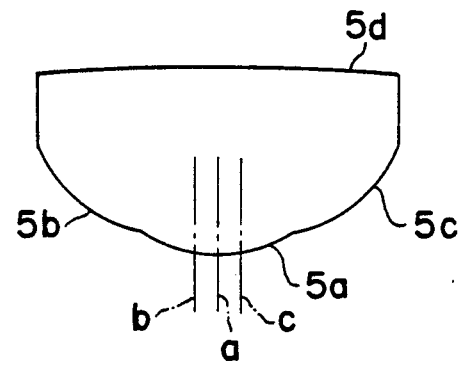
FIG. 3(A) and FIG. 3(B) are respectively a sectional view and a front elevation view of a first embodiment of the light receiving lens according to the invention.
Figure 3B:
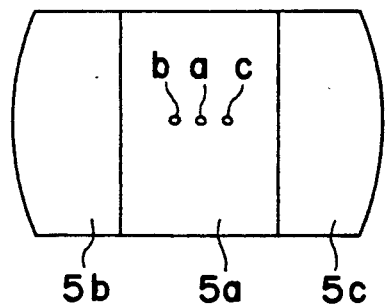

FIGS. 1, 2, 3(A) and 3(B) show a first embodiment of the invention, FIG. 1 being a schematic diagram of the layout for an optical system for the distance measuring device in view of the entire target area. A light-emitting element 1 for distance measurement of which the details are shown in FIG. 2, is of the near infrared type. A light projecting lens 2 projects three light beams 3a–3c to form spot images 4a–4c on an object plane 4. A light receiving lens 5 shown also in FIGS. 3(A) and 3(B) is spaced from the light projecting lens 2 by a so-called base line length L. A light receiving sensor 6 is in the form of, for example, a PSD (position sensitive device) or like semiconductor position detector. The light-emitting element 1, as shown in the sectional view of FIG. 2, has three light sources 1a, 1b and 1c arrayed in a horizontal row. These sources, in this instance, are energized successively in time serial fashion, but may otherwise be energized simultaneously if necessary for the kind of the light sensor used. The light beams for distance measurement issuing from these sources pass through the light projecting lens 2 and are projected in three directions 3a, 3b and 3c that hit a common object plane 4 at points in one horizontal row. As the directions 3a, 3b and 3c contain respective objects 4a–4c, the light beams for distance measurement returning back from the objects by reflection are converged by the light receiving lens 5 to form reflected spot images on the light receiving sensor 6. The light receiving lens 5 as shown in the sectional view of FIG. 3(A) and the front elevation view of FIG. 3(B), has three light entrance portions 5a, 5b and 5c of spheres whose optical axes are indicated by reference characters a, b and c. The light receiving lens 5 is disposed with reference to the light projecting lens 2 so as to become perpendicular to the direction in which the light beams 3a–3c spread, or vertically of the projection lens 2 as viewed in FIG. 1. Further, the light receiving lens 5 is oriented so that the direction in which the light entrance portions 5a, 5b and 5c are arrayed is parallel to the direction in which the light beams 3a–3c spread and, therefore, perpendicular to the direction connecting the light receiving lens 5 and the light projecting lens 2 (or the so-called base line). With this, the light beam reflected from the object, for example, 4b on the left-hand side passes through the left entrance portion 5b of the light receiving lens 5 and focuses an image on the light receiving sensor 6. The light beam reflected from the object 4c on the right-hand side passes through the right entrance portion 5c of the light receiving lens 5 and focuses an image on the light receiving sensor 6. The light beam reflected from the central object 4a passes the central entrance portion 5a of the light receiving lens 5 and focuses an image on the light receiving sensor 6.

Here, when the objects 4a–4c are at the same distance or in the common plane, the light beams reflected from the objects are all brought into almost the same focus position on the light receiving sensor 6. For this purpose, the entrance portions 5a–5c of the light receiving lens 5 are made not to have a common axis, but to have respective individual axes spaced from each other in a line parallel to the spreading direction of the projected light beams 3a–3c.

Figure 4:
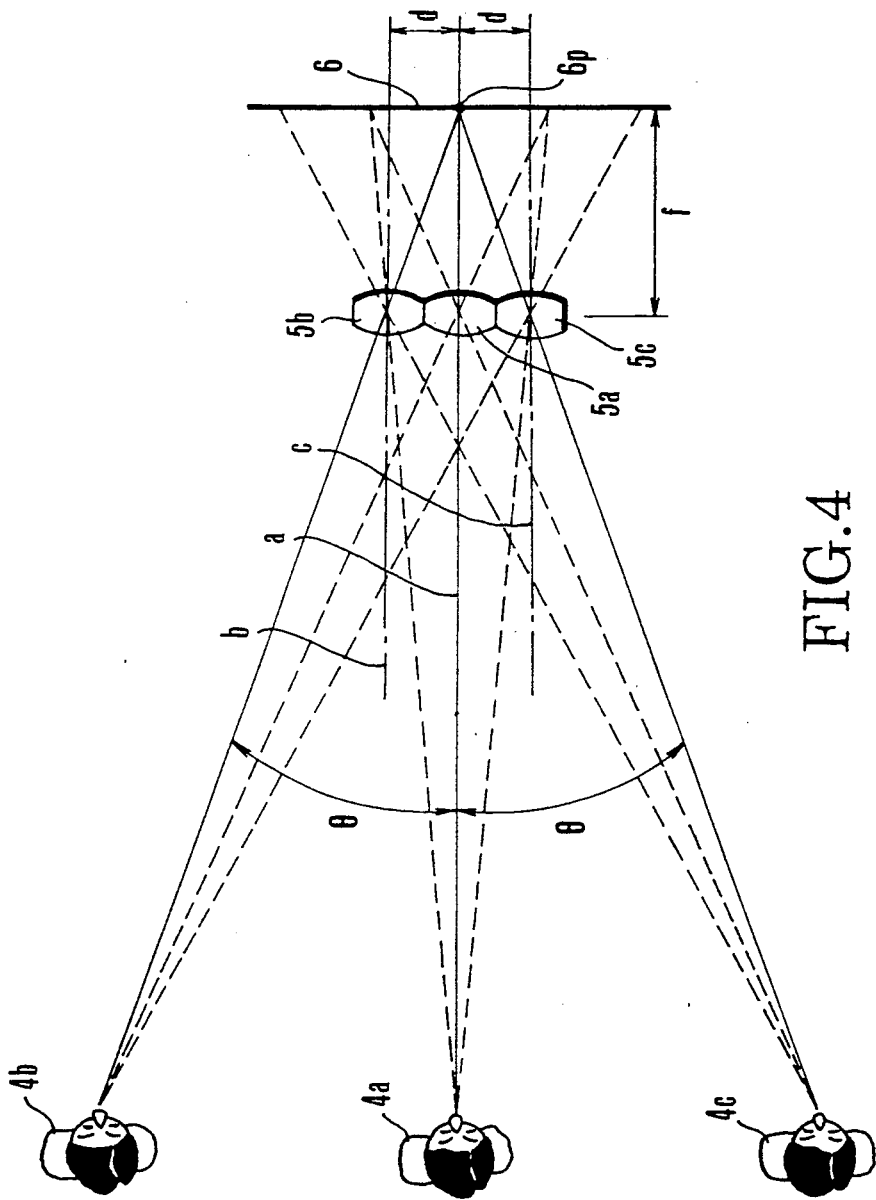
FIG. 4 is a diagram of geometry to explain the fundamental function of the invention.

The spacings of the optical axes of the entrance portions are explained by using the schematically depicted FIG. 4. The light receiving lens 5 having the entrance portions 5a, 5b and 5c is positioned on the object side of the light receiving sensor 6 at a distance f. The optical axis "a" of the central entrance portion 5a crosses the light receiving sensor 6 at a point 6p. The lines connecting the cross point 6p with the respective entrance portions cross the object plane 4 parallel to the image sensing surface of the light receiving sensor 6 at points 4a, 4b and 4c, respectively. An angle that the cross points 4b-6p-4a make and another angle that the cross points 4a-6p-4c make each are denoted by $\theta$. The spacings between the optical axes of the entrance portions 5a and 5b and between the entrance portions 5a and 5c each have a value d.

In such a system, as is apparent from the geometry, for f, $\theta$ and d, a relationship expressed by the following equation is obtained:

$$\tan \theta = d/f \tag{1}$$

From the above-described equation, it is understandable that so long as the objects 4a, 4b and 4c are separate from each other by the angle $\theta$ as observed from the light receiving sensor 6 side, AF light beams reflected from the objects 4a, 4b and 4c come past the respective entrance portions 5a, 5b and 5c to the same position on the light receiving sensor 6. Again, besides the target lines connecting the object 4a with the portion 5a, the object 4b with the portion 5b and the object 4c with the portion 5c, there are stray lines 4a-5b, 4a-5c, 4b-5a, 4b-5c, 4c-5a and 4c-5b which are of no use in distance measurement. Because the rays of light along these stray lines also come across the light receiving lens 5, in order that only the rays of light along the target lines are exclusively allowed to arrive at the light receiving sensor 6, the width of the light receiving sensor 6 is chosen to take an appropriate value depending on the given values of f and $\theta$ or d.

In a first embodiment of the invention, with regard to the light receiving lens (FIG. 3(A) and 3(B)), its surfaces which faces the light receiving sensor 6 is made to have one sphere 5d, and its entrance portions 5a, 5b and 5c are made to have shapes as contiguous to each other as possible. Therefore, the optical axes "b" and "c" of the entrance portions 5b and 5c take their places in the entrance portion 5a. Also, the entrance portion 5a is made to have as large a relative aperture as 1.0 or thereabout in F-number. To obtain high grade imagery, therefore, an aspheric surface is employed there. Also, with regard even to the relationship of f, $\theta$ and d, in order to attain good stabilization of aberrations against variation of the object distance and avoidance of the entrance portions from separating as far as possible, the rule defined by the equation (1) may be tolerated to some extent. However, it is desirable to satisfy the following conditions:

$$0.8 < f_B/f_A < 1.2 \tag{2}$$

$$0.8 < d/(f_B \tan \theta) < 1.5 \tag{3}$$

where $f_A$ is the focal length of the paraxial zone of that fraction of the light receiving lens which is defined by the central entrance portion 5a and the surface facing the light receiving sensor 6, and $f_B$ is the focal length of the paraxial zone of that fraction of the light receiving lens which is defined by the entrance portion 5b or 5c adjacent to the central entrance portion 5a and the surface facing the light receiving sensor 6.

The focal lengths $f_A$ and $f_B$ of the equation (2) are the fundamental parameters in the trigonometry survey type distance measurement which affects the amount of movement on the light receiving sensor 6 of the light ray for distance measurement from the object. When these parameters have small values, the amount of movement on the light receiving sensor 6 becomes small, which in turn requires high precision accuracy. For $f_B/f_A = 1$, the distances to the objects 4a, 4b and 4c can be measured with the same accuracy. Although this is ideal, a deviation within the range of the inequalities (2) produces no problem for assuring an acceptable level of accuracy.

Concerning the inequalities (3), $d/(f_B \cdot \tan \theta) = 1$ represents the condition that brings the light beams for AF reflected from the objects 4a, 4b and 4c to the same position on the light receiving sensor 6, as has been described before. If the value of this factor lies within the range of 0.8 to 1.5, it is possible that despite the expansion of the incident position on the light receiving sensor 6, the size of the light receiving sensor 6 does not need to be increase too much in order to ensure that all the images are received.

It is to be noted that, with regard to the exit surface 5d, it is recommended to shape it to one sphere and to have a radius of curvature equal to 10 or higher times as much as the length $f_A$.

Meanwhile, the fact that one of the surfaces of the light receiving lens which faces the sensor has been made to be a surface of continuous curvature is very advantageous in the point of improving the production tolerances as the light receiving lens is manufactured by using synthetic resin and ejection molding techniques.

As the requirement of forming the surface of the entrance side to as continuous shapes as possible is looked from another point of view, it is desirable to satisfy the following condition:

$$0.4 < D/f_A < 1.5 \qquad (4)$$

where D is the distance from the vertex of the entrance portion (5a) of the light receiving lens to the convex surface of the sensor-side surface of the light receiving lens. This may be said to be the thickness measured along the optical axis "a".

Figure 5:
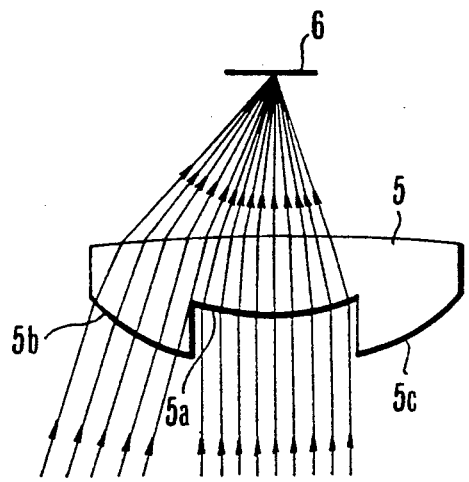
FIG. 5 is a sectional view of a light receiving lens taken as an ideal case to explain the effect of the invention.

When the distance D is smaller than the lower limit of the inequalities (4), the light receiving lens takes a form, if depicted with exaggeration, as shown in FIG. 5, where the entrance portions 5a, 5b and 5c have independent shapes so that those fractions of the entrance portions 5b and 5c which are near the entrance portion 5a cannot effectively be used to receive the light, thus giving a disadvantage of reducing the amount of light passing through the entrance portions 5b and 5c. The value of the lower limit gives the acceptable minimum level for that matter. When the lower limit is exceeded, the thickness of a marginal portion of each of the entrance portions 5b and 5c is too much increased. When the upper limit is exceeded, the thickness of the light receiving lens is too much increased. This leads to an increase in the size of the distance measuring device objectionably. Particularly, in application to the ordinary camera, this is conspicuous. More desirably, the lower limit is set to 0.6 and the upper limit to 1.0 with advantages of increasing the accuracy of detection and reducing the size. To improve the imaging performance of the light receiving lens, the entrance portions 5a, 5b and 5c and the exit surface 5d are desirably all made aspheric.

On the other hand, to achieve a further improvement of the imaging performance, it is desired to satisfy the following condition:

$$-0.05 < \phi_R/\phi_A < 0.15, \ \phi_A > 0 \qquad (5)$$

where $\phi_A$ is the refractive power of the A portion (between the entrance surface 5a and the exit surface 5d) of the light receiving lens and $\phi_R$ is the refractive power of only the exit surface 5d on the light receiving sensor side of the A portion of the light receiving lens.

When the refractive power $\phi_R$ is stronger in the minus sense as exceeding the lower limit, the curvature of the surface of the object side of the light receiving lens is too strong to avoid deterioration of the imaging performance. When the refractive power $\phi_R$ is strong beyond the upper limit, the use of one sphere or asphere in the surfaces of the light receiving sensor side of the A portion of the light receiving lens and of the B portion (the portion adjacent to the A portion) of the light receiving lens results in production of large decentering aberrations of the light beam passing through the B portion of the light receiving lens, which deteriorates the imaging performance objectionably. More desirably, the lower limit set to 0 (flat plane) and the upper limit to 0.08. For this range, a better result is attained.

Numerical Example 1 of the Light Receiving Lens: For $\theta = 6.0°$, the shapes of the aspheric surfaces at the object side of the light receiving lens are:

|  | A portion | B portion |
| --- | --- | --- |
| Radius of Curvature of Osculating Sphere | $R_1 = \infty$ | $R_1 = \infty$ |
| Aspheric Coefficients | A = 9.356 × 10$^{-1}$ | A = 9.343 × 10$^{-1}$ |
|  | B = −2.973 × 10$^{-1}$ | B = 3.416 × 10$^{-1}$ |
|  | C = 8.267 | C = 1.794 × 10$^{-1}$ |
|  | D = −2.801 × 10 | D = 2.065 × 10$^{-1}$ |
|  | E = −6.66 | E = −3.523 × 10$^{-1}$ |
|  | F = 1.625 × 10$^2$ | F = 6.742 × 10$^{-1}$ |
|  | G = 2.503 × 10 | G = −2.739 |
|  | H = −5.219 × 10$^2$ | H = 2.595 |
| The radius of Curvature of the Sphere at the Image side |  | $R_2 = -12.664$ |
| Refractive Index for λ = 880 nm |  | n = 1.5233 |
| Thickness | D = 0.773 | D = 0.722 |
| Optical Axis Spacing |  | d = 0.107 |

It should be noted that the thickness D of the B portion of the light receiving lens is the axial separation between the lines perpendicular to the optical axis which pass respectively the cross point of the optical axis with the extension of its surface of the object side to the optical axis and the vertex of the rear surface.

Numerical Example 2 of the Light Receiving Lens: For $\theta = 6.0°$, the shapes of the surfaces at the object side of the light receiving lens are:

|  | A portion | B portion |
|---|---|---|
| Radius of Curvature of Osculating Sphere | $R_1 = \infty$ | $R_1 = \infty$ |
| Aspheric Coefficients | $A = 1.012$ | $A = 1.011$ |
|  | $B = -2.603 \times 10^{-1}$ | $B = 9.472 \times 10^{-1}$ |
|  | $C = 8.698$ | $C = -8.391 \times 10^{-1}$ |
|  | $D = -2.808 \times 10$ | $D = 2.224$ |
|  | $E = -6.731$ | $E = -1.669 \times 10^{-1}$ |
|  | $F = 1.623 \times 10^2$ | $F = -4.781 \times 10^{-1}$ |
|  | $G = 2.451 \times 10$ | $G = -1.518$ |
|  | $H = -5.230 \times 10^2$ | $H = -6.226$ |
| Radius of Curvature of Sphere at Image side | $R_2 = -11.708$ | |
| Refractive Index for $\lambda = 880$ nm | $n = 1.4838$ | |
| Thickness | $D = 0.756$ | $D = 0.705$ |
| Optical Axis Spacing | $d = 0.107$ | |

Numerical Example 3 of the Light Receiving Lens: For $\theta = 7.0°$, the shapes of the surfaces on the object side of the light receiving lens are:

|  | A Portion | B Portion |
|---|---|---|
| Radius of Curvature of Osculating Sphere | $R_1 = \infty$ | $R_1 = \infty$ |
| Aspheric Coefficients: | $A = 9.483 \times 10^{-1}$ | $A = 9.479 \times 10^{-1}$ |
|  | $B = -3.796 \times 10^{-1}$ | $B = 5.188 \times 10^{-1}$ |
|  | $C = 8.623$ | $C = 2.759 \times 10^{-1}$ |
|  | $D = -2.615 \times 10$ | $D = 2.860 \times 10^{-1}$ |
|  | $E = -7.797$ | $E = -3.038 \times 10^{-1}$ |
|  | $F = 1.356 \times 10^2$ | $F = 6.905 \times 10^{-1}$ |
|  | $G = 2.181 \times 10$ | $G = -2.775$ |
|  | $H = -3.826 \times 10^2$ | $H = 2.567$ |
| Radius of Curvature of Sphere at Image side | $R_2 = -33.393$ | |
| Refractive Index for $\lambda = 880$ nm | $n = 1.5233$ | |
| Thickness | $D = 0.798$ | $D = 0.748$ |
| Optical Axis Spacing | $d = 0.126$ | |

| Condition | | Numerical Example of Light Receiving Lens | | |
|---|---|---|---|---|
| No | Factor | 1 | 2 | 3 |
| 1 | $f_B/f_A$ | 1.00 | 1.00 | 1.00 |
| 2 | $d/(f_B \cdot \tan \theta)$ | 1.02 | 1.02 | 1.03 |
| 3 | $D/f_A$ | 0.773 | 0.756 | 0.798 |
| 4 | $\phi_R/\phi_A$ | 0.0413 | 0.0413 | 0.0157 |

The shape of the aspheric surface is expressed in the coordinates with an X-axis in the optical axis and an Y-axis in the direction perpendicular to the optical axis, the direction from the object side to the image side being taken as positive, and the cross point of the vertex of the lens with the X-axis being used as the original point, by the following equation:

$$X = (1/R)Y^{2}/(1+(1-(Y/R)^2)^{1/2}) + AY^2 + BY^4 + CY^6 + DY^8 + EY^{10} + FY^{12} + GY^{14} + HY^{16}$$

Another Embodiment

Though, in the first embodiment, the light receiving sensor side of the light receiving lens has been made to be one sphere, it is of course acceptable to make it an aspheric sphere. It is also possible to make it a multi-optical axis surface like the entrance portions 5a, 5b and 5c. Also, though, in the first embodiment, the entrance portion is 3 in number, it may be 2 or 4 or more.

Also, though in the first embodiment all the optical axes of the entrance portions 5a, 5b and 5c of the light receiving lens lie in a common plane, the light receiving lens may be otherwise constructed in such a form that these optical axes do not lie in one plane, thereby making it possible to reduce the size of the light receiving sensor and to improve the S/N ratio of the distance measuring light beam to the ambient light. This is explained in FIG. 6.

Figure 8:
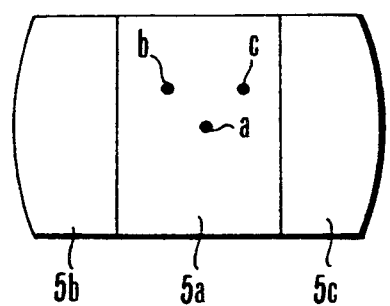
FIG. 8 is a front elevation view of an example of a modification of the light receiving lens.
Figure 6:
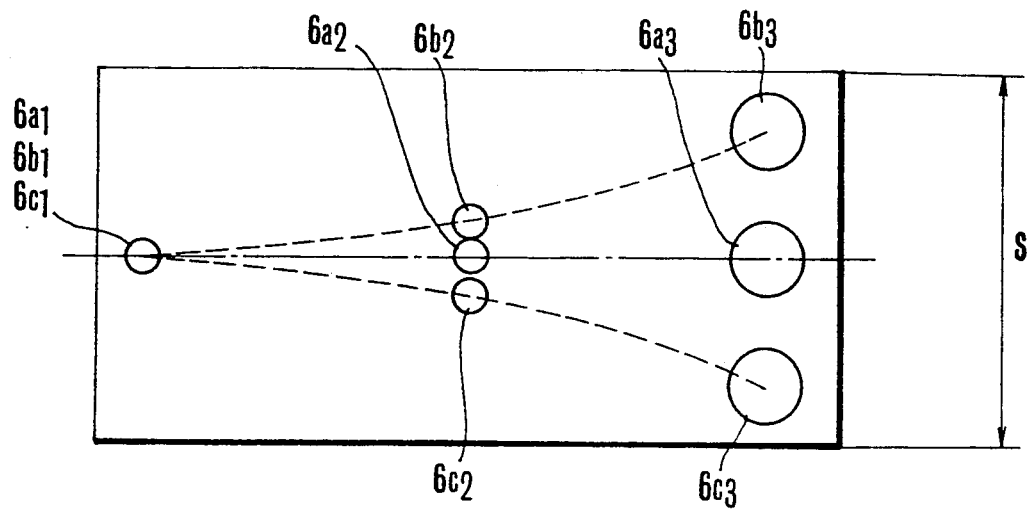
FIG. 6 is a plan view to explain the states of light spots on the light receiving sensor.
Figure 7:
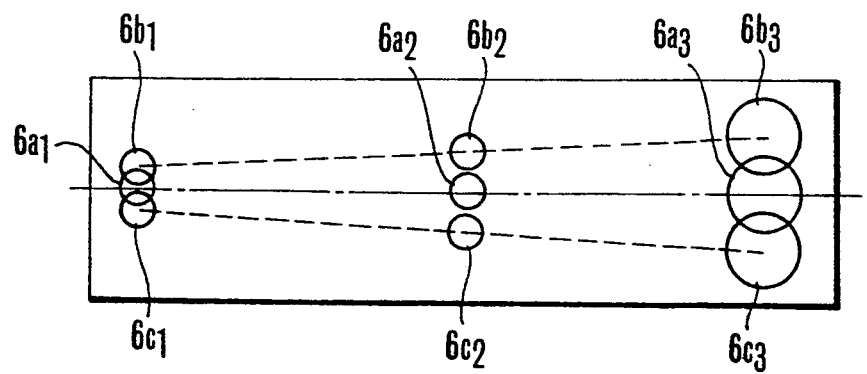
FIG. 7 is a plan view to explain the advantage arising from the shift of the axis at the light entrance surface of the light receiving lens.
Figure 9:
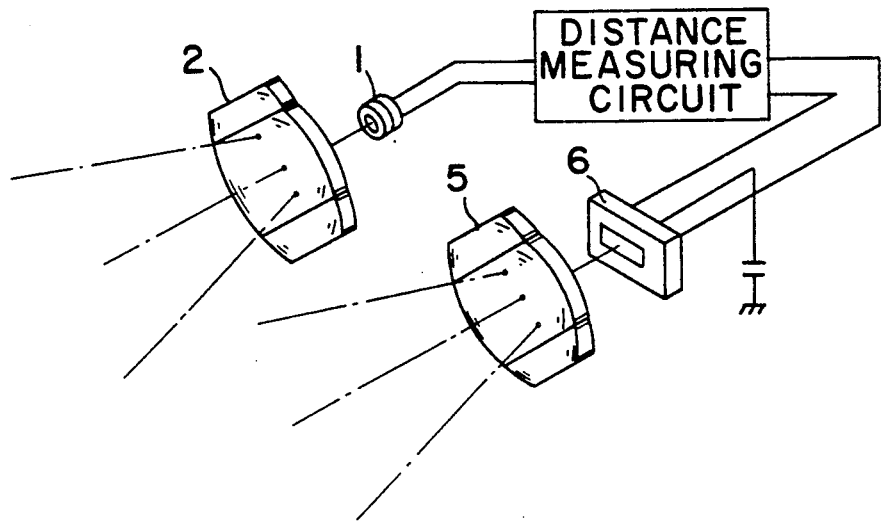
FIG. 9 is a perspective view of the conventional multi-point distance measuring device.
Figure 10:
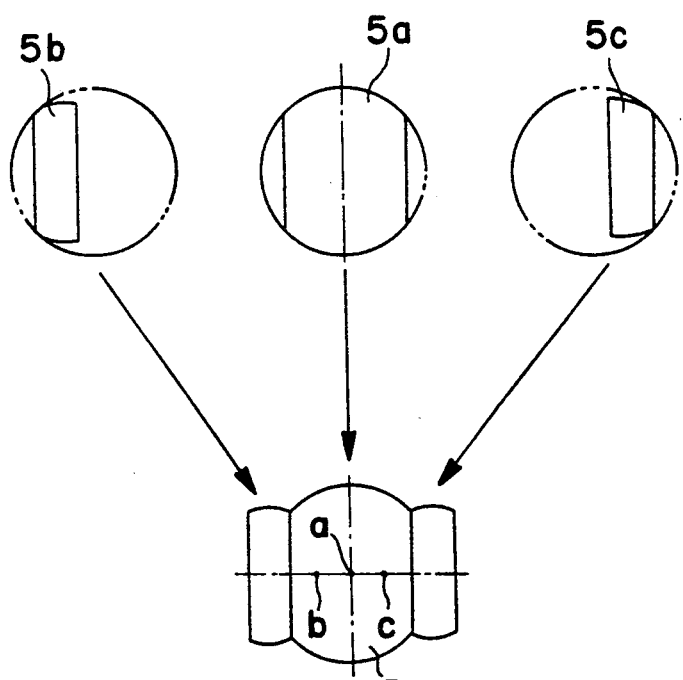
FIG. 10 is an elevation view to explain the structure of the conventional light receiving lens.

FIG. 6 shows the case where the optical axes of the entrance portions 5a, 5b and 5c of the light receiving lens lie in the same plane. With all the distance measuring directions containing respective objects, when the object distance varies, the distance measuring light beams take different focus positions on the light receiving sensor 6, as shown in FIG. 6. Spot reflection images $6a_1$, $6b_1$, $6c_1$ for the objects at a long distance, images $6a_2$, $6b_2$, $6c_2$ for the objects at an intermediate distance, and images $6a_3$, $6b_3$, $6c_3$ for the objects at a near distance, are formed with the light beams reflected from the objects in the individual directions focused on the light receiving sensor 6. Dashed line curves represent the loci of movement of the spot images as the object distance has any value in the regions between the aforesaid discrete distances. In general, if the images of the objects at the far or intermediate distance are made particularly good, and the spot images from all the directions are focused in the same position, the spot images of the objects at the near distance from all the directions are spaced away. As a result, the width S of the light receiving sensor must be made large. A good method for solving this is to shift the marginal entrance portions 5b and 5c of the light receiving lens slightly toward the light projecting lens from the central entrance surface. That is, as shown in FIG. 8, the optical axes "b" and "c" of the flank entrance portions 5b and 5c are nearer to the light projecting lens than the optical axis "a" of the central entrance portion 5a. With this, the spot images on the light receiving sensor become like FIG. 7. Thus, the width S of the light receiving sensor can be reduced. Though the width of the light receiving sensor is made smaller, the received amount of light for distance measurement remains unchanged. Because the ambient light reaching the light receiving sensor can only be lessened, the S/N ratio of the ambient light and the distance measuring light beam is improved. Hence, the accuracy of distance measurement can be increased.

According to the invention, in the distance measuring device for measuring the distances of a plurality of points in the field of view that has been considered from the past, the features including the concrete example of the construction and arrangement of the elements of the optical systems with the advantages of improving the imaging performance and increasing the accuracy of distance measurement are revealed.

What is claimed is:

1. In a device having a projector for projecting distance measuring light in a plurality of directions, distance measurement apparatus comprising:

a light receiving lens including a plurality of sub-lens portions and positioned to receive the distance measuring light reflected from objects; and a photo-sensor for receiving the distance measuring light having passed through said light receiving lens to produce a signal corresponding to the distances to objects, wherein optical axes of said sub-lens portions lie side by side in a direction perpendicular to a direction connecting the projector with said light receiving lens, and wherein optical axes of marginal sub-lens portions are offset toward the projector from an optical axis of a central sub-lens portion.

2. A distance measuring device, comprising:

means for emitting a plurality of light beams in a plurality of directions;

a light receiving lens having a plurality of optical axes, for receiving the plurality of light beams reflected from objects in said plurality of directions; and light receiving means for receiving the reflected light beams passing through said light receiving lens and providing an output corresponding to distances to the objects;

said light receiving lens having (1) a central portion with a thickness D, a focal length $f_A$, and a refractive index $\phi_A$, and (2) a second portion adjacent said central portion, surfaces of said central and second portions closest to said light receiving means comprising one spherical surface having a refractive power $\phi_R$, said central and second portions being disposed to satisfy the following conditions:

$0.4 < D/f_A < 1.5$ and $-0.05 < \phi_R/\phi_A < 0.15, \phi_A > 0.$

* * * * *

UNITED STATES PATENT AND TRADEMARK OFFICE
CERTIFICATE OF CORRECTION

PATENT NO. : 5,125,735

DATED : June 30, 1992

INVENTOR(S) : OIZUMI ET AL.

It is certified that error appears in the above-identified patent and that said Letters Patent is hereby corrected as shown below:

On the Title Page, item [57],

"prising" should read --prise--; and "the" should read --The--.

COLUMN 1

Line 39, "is to take" should read --takes--.

COLUMN 1

Line 40, "even" should be deleted.

COLUMN 4

Line 30, "faces" (first occurrence) should read --face--.

COLUMN 5

Line 12, "be" should be deleted.

UNITED STATES PATENT AND TRADEMARK OFFICE
CERTIFICATE OF CORRECTION

PATENT NO. : 5,125,735

DATED : June 30, 1992

INVENTOR(S) : OIZUMI ET AL.

It is certified that error appears in the above-identified patent and that said Letters Patent is hereby corrected as shown below:

COLUMN 6

Line 35, "set" should read --should be set--.

COLUMN 7

Line 65, "be" (second occurrence) should be deleted.

Signed and Sealed this

Second Day of August, 1994

Attest:

BRUCE LEHMAN

Attesting Officer

Commissioner of Patents and Trademarks